(12) United States Patent
Xu

(10) Patent No.: US 7,382,008 B2
(45) Date of Patent: Jun. 3, 2008

(54) ULTRA-SMALL CMOS IMAGE SENSOR PIXEL USING A PHOTODIODE POTENTIAL TECHNIQUE

(75) Inventor: Weize Xu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/416,055

(22) Filed: May 2, 2006

(65) Prior Publication Data

US 2007/0257284 A1 Nov. 8, 2007

(51) Int. Cl.
*H01L 31/062* (2006.01)
*H01L 31/113* (2006.01)

(52) U.S. Cl. .................... 257/291; 257/292
(58) Field of Classification Search ......... 257/290–294
See application file for complete search history.

(56) References Cited

U.S. PATENT DOCUMENTS

2001/0054713 A1* 12/2001 Miyagawa ............... 257/292
2002/0118289 A1   8/2002 Choi
2006/0038207 A1*  2/2006 Hong et al. ............... 257/292
2007/0131992 A1*  6/2007 Dosluoglu et al. ........ 257/292
2007/0152248 A1*  7/2007 Choi et al. ................ 257/292

FOREIGN PATENT DOCUMENTS

EP    1 107 581    6/2001

* cited by examiner

*Primary Examiner*—Cuong Nguyen
(74) *Attorney, Agent, or Firm*—Peyton C. Watkins

(57) ABSTRACT

An image sensor includes a photosensitive region that accumulates charge corresponding to received incident light; a transfer gate for transferring all or a portion of the charge from the photosensitive region; a voltage supply having an increasing voltage over time that is applied to the transfer gate; a floating diffusion for receiving the all or a portion of the charge from the photosensitive region and converting the charge to a voltage; an amplifier for receiving and amplifying a signal from the floating diffusion; a pulse detector for detecting a voltage pulse from the amplifier; and a counter for counting clock cycles between initiation of the increasing voltage until a signal is received from the detector which indicates initiation of charge transfer from the photosensitive region to the floating diffusion.

16 Claims, 4 Drawing Sheets

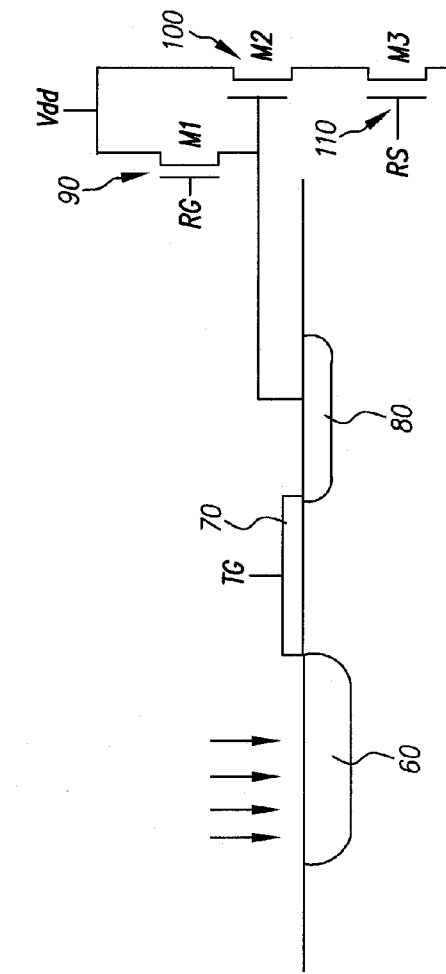
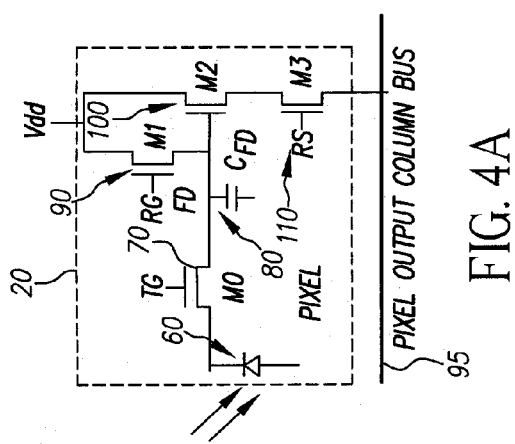
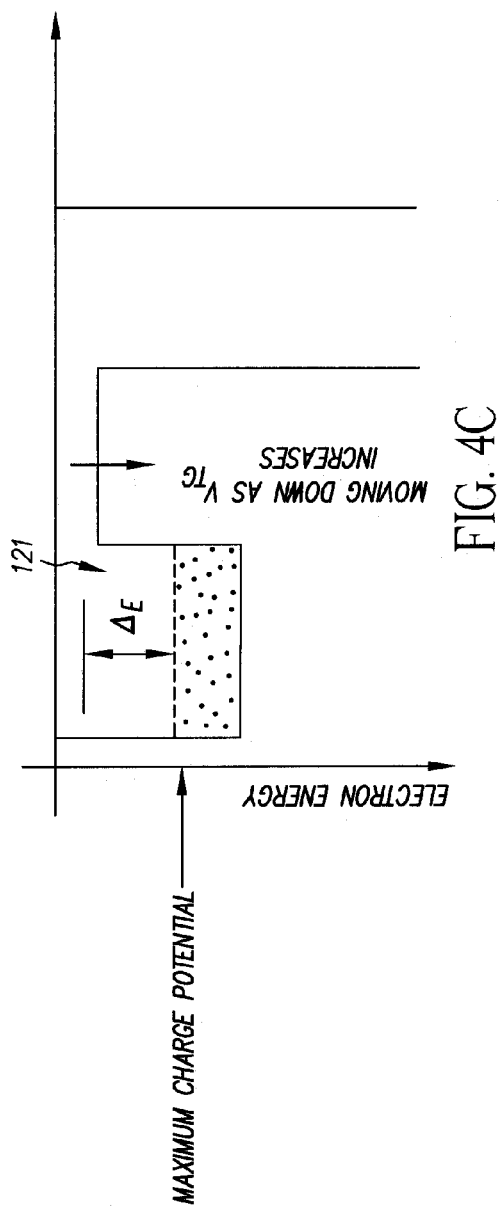
FIG. 4A
FIG. 4B
FIG. 4C

ULTRA-SMALL CMOS IMAGE SENSOR PIXEL USING A PHOTODIODE POTENTIAL TECHNIQUE

FIELD OF THE INVENTION

The invention relates generally to the field of image sensors, and more particularly to, such CMOS image sensors in which the image signal is converted into a digital signal immediately after output from the pixel array.

BACKGROUND OF THE INVENTION

One of the trends in CMOS image sensor is the continue scale down of the pixel size. The present CMOS image sensors all have the same or close structures: the photosensitive devices such as photodiode FD and photogate in each pixel to convert the optical signal to electrical charge, a floating diffusion (FD) capacitor converting charge to voltage, and an amplifier buffering the floating diffusion capacitance from the large output bus capacitance and sending the electrical signal out of the pixel array. The pixel output signal swing is preliminary determined by the FD capacitance and the number of charge can be captured by the PD. The maximum number of charge is proportional to the size of the photodiode. In order to maintain sensor performance, large PD size and the minimum ratio (>30%) between PD size and pixel size or the fill-factor are required which limits the further reduction of pixel size. In this invention, the photodiode electrical potential, instead of the voltage at the floating diffusion, is used as the image signal and is converted to digital signal such that reductions in both the pixel size and the fill-factor are achieved without affecting the sensor performance.

SUMMARY OF THE INVENTION

The present invention is directed to overcoming one or more of the problems set forth above. Briefly summarized, according to one aspect of the present invention, the invention includes an image sensor comprising a photosensitive region that accumulates charge corresponding to received incident light; a transfer gate for transferring all or a portion of the charge from the photosensitive region; a voltage supply having an increasing voltage over time that is applied to the transfer gate; a floating diffusion for receiving the all or a portion of the charge from the photosensitive region and converting the charge to a voltage; an amplifier for receiving and amplifying a signal from the floating diffusion; a pulse detector for detecting a voltage pulse from the amplifier; and a counter for counting clock cycles between initiation of the increasing voltage until a signal is received from the detector which indicates initiation of charge transfer from the photosensitive region to the floating diffusion.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantage of high-speed processing, lower power dissipation and low noise. It further eliminates the effects of non-linearity and threshold variations in the pixel amplifier. It also eliminates the floating diffusion variation among the pixels.

BRIEF DESCRIPTION OF THE DRAWINGS

FIG. 4a illustrates the image sensor of the present invention in schematic form;

FIG. 4b illustrates a cross section of the present invention;

FIG. 4c illustrates a well potential diagram for FIG. 4b for clearly illustrating the concept of the present invention.

DETAILED DESCRIPTION OF THE INVENTION

Figure 1:
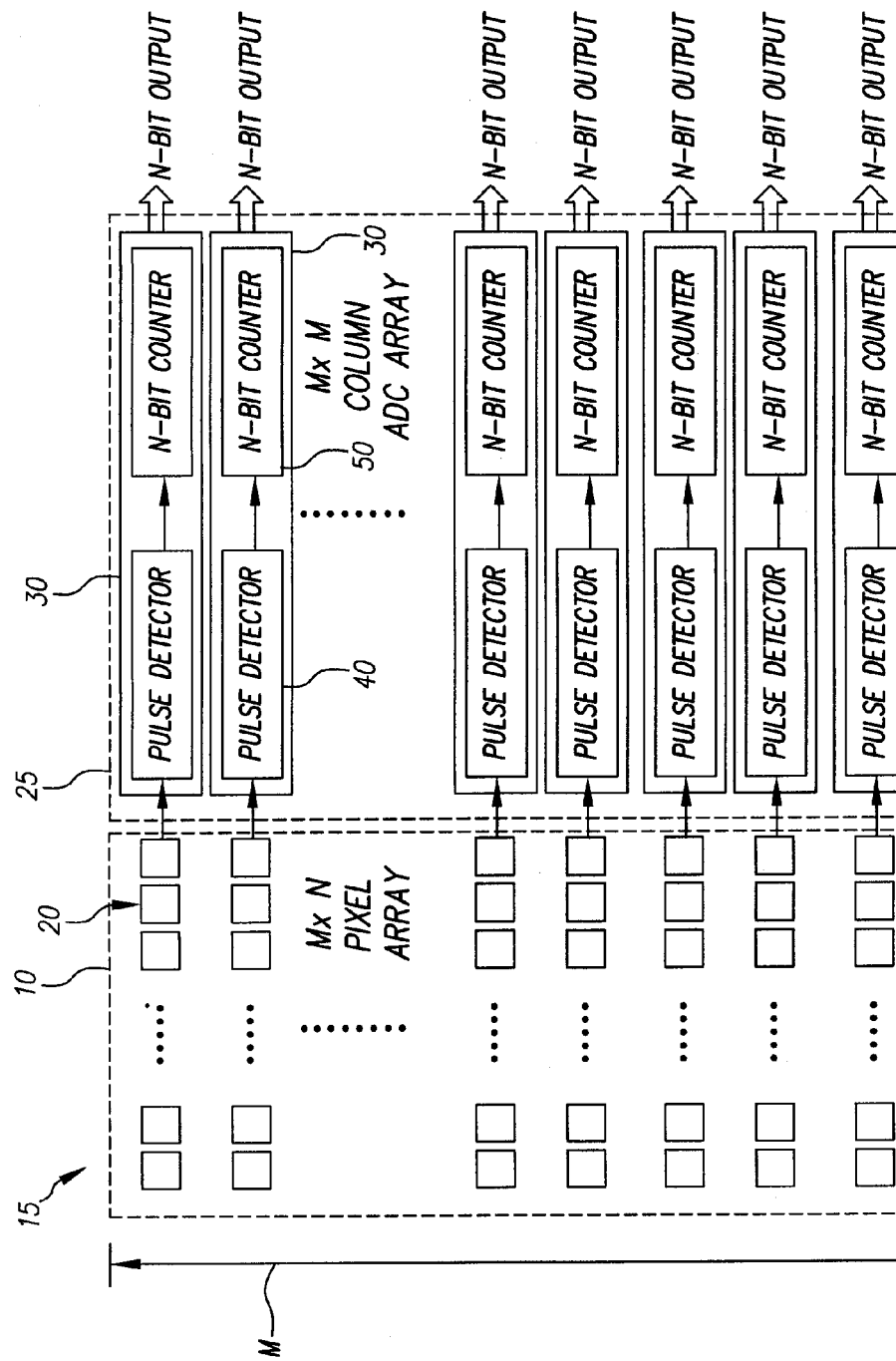
FIG. 1 is an illustration of a pixel array and its associated circuitry of the present invention.

Referring to FIG. 1, there is shown a pixel array 10 of an image sensor 15 of the present invention having a plurality of pixels 20 and a plurality of analog-to-digital converters 30 for receiving and storing the signals from the plurality of pixels 20 in a predetermined manner. An analog-to-digital converter array 25 is connected to the output of the pixel array 10. A plurality of column analog-to-digital converters 30 comprise the analog-to-digital converter array 25. A plurality of pulse detectors 40 are respectively connected to the output of the pixel bus 95 (as shown in FIG. 2), and a plurality of counters 50 are respectively connected to the plurality of pulse detectors 40.

For clarity of understanding, it is noted that the above-described apparatus of the present invention limits the analog circuit usage (for the purpose of noise and power dissipation reduction) and maximally utilizes the advantages of digital circuits. It is also noted that FIG. 2 illustrates only one pixel and its associated circuitry of the present invention for illustrating a representative pixel of the plurality of pixels of the present invention for clarity of understanding. It is understood that the present invention includes a plurality of such pixels; for example, the pixel array 10 of FIG. 1. As shown in FIG. 2, the pixel 20 is composed of a photosensitive region or photodiode 60 that accumulates charge corresponding to received incident light. A transfer gate (TG) 70 transfers charge from the photodiode 60 to a charge-to-voltage conversion region or floating diffusion ($C_{FD}$) 80, which converts charge to a voltage signal. A reset transistor (RG) 90 sets a reference voltage for both the floating diffusion ($C_{FD}$) 80 and the pixel output column bus 95 which will be connected to the input of the pulse detector 40 by closing switch S1. An amplifier or amplifier transistor (M2) 100 receives and amplifies the signal from the floating diffusion ($C_{FD}$) 80. A row select transistor 10 selects the particular row of pixels for output to the pixel bus 95.

Figure 2:
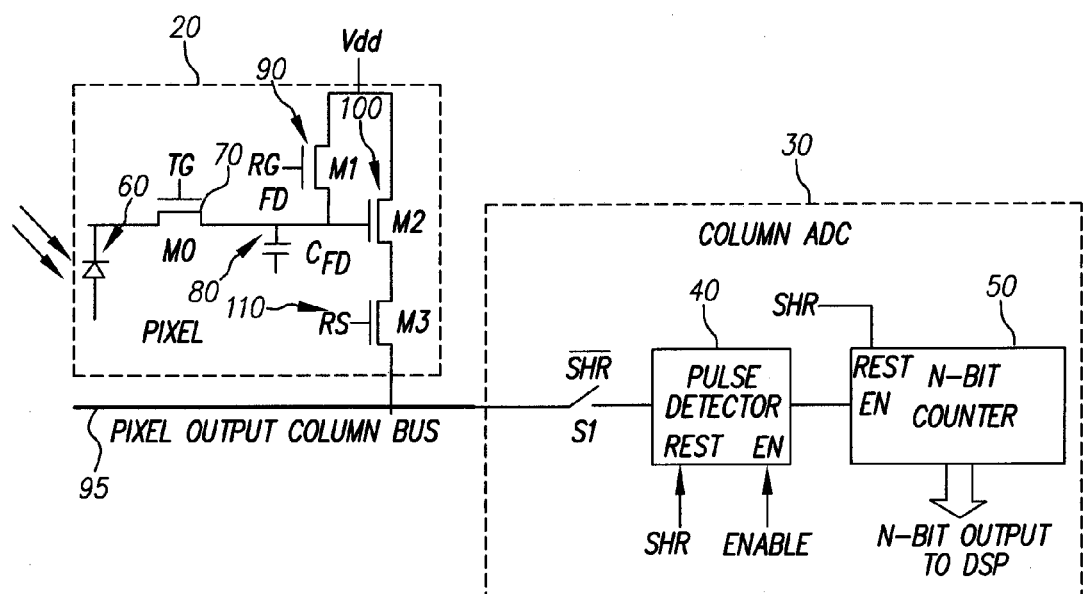
FIG. 2 is a detailed view of a pixel and the analog-to-digital converter of FIG. 1.
Figure 3:
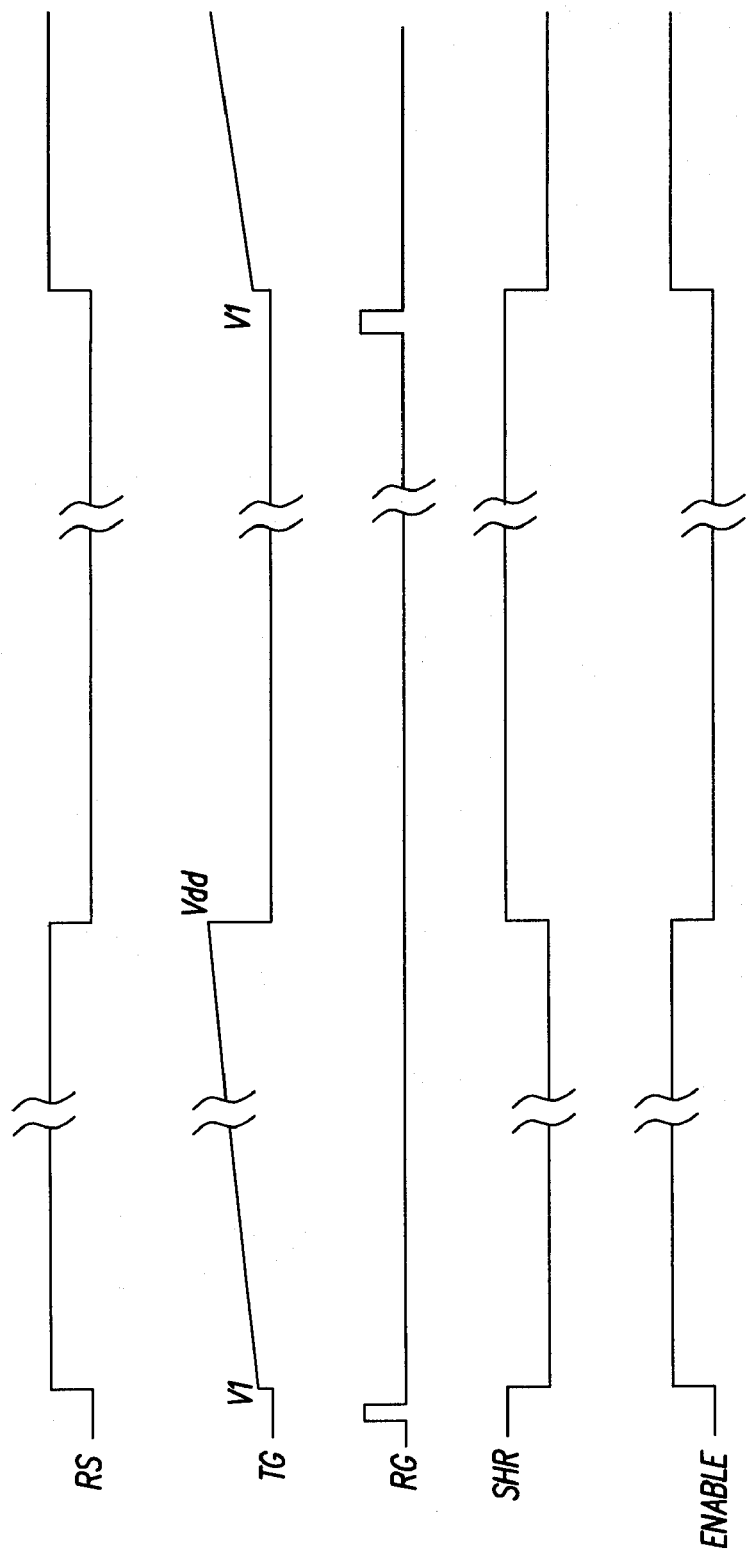
FIG. 3 is a timing diagram of FIG. 2.

FIG. 3 includes the preferred timing for FIG. 2 and includes common timing signal acronyms for the timing signal to be applied to a component referred to in FIG. 2-RS, TG, RG, SHR and Enable. Referring now to FIGS. 2 and 3, an image is captured by the plurality of photodiodes 60 during integration, and after integration, a row of pixels in the pixel array 10 is selected for readout by applying a "high" to the gate of row select transistor (RS) 10. A pulse voltage is then applied to the gate of the reset transistor (RG) 90 to clear charge from the floating diffusion ($C_{FD}$) capacitor 80 and to then reset the floating diffusion ($C_{FD}$) 80 to the reference voltage. The voltage at floating diffusion ($C_{FD}$) 80 is amplified by the amplifier 100 and sent out to the column bus 95. With the reference signal at the column bus 95, clock SHR goes from "high" to "low" to close switch S1. The SHR clock also resets the counter 50 and pulse detector 40. Following the SHR pulse, an enable clock enables the counter in each column circuit to start counting the number of clock cycles. An initial voltage V1 is applied to the transfer gate and starts to increasingly ramp (substantially linear ramp) the voltage. During the transfer gate voltage ramping, the voltage at floating diffusion ($C_{FD}$) 80 is buffered by source follower amplifier 100 and sent out to the analog-to-digital converter array 25 via column bus 95. The pulse detectors 40 one in each column analog-to-digital converter 30 start to monitor the pixel output voltage. The pulse detector output changes from low to high when a pulse voltage at the pixel output is detected and the counter 50 is stopped. It is noted that the voltage pulse can be either in a positive or negative direction. In other words, the pulse detector 40 is set at a reference voltage and the voltage pulse can be either higher or lower than the reference voltage. The counted number of clock cycles is the raw digitalized signal value for each correspondent column.

When the ramped transfer gate (TG) voltage generates a sufficient potential underneath the TG gate 70, charge accumulated in photodiode 60 begins to flow from photodiode 60 to floating diffusion ($C_{FD}$) 80. It is noted that the present invention uses the floating diffusion 80 to sense the "beginning" or "initiation" of charge transfer from the photodiode 60, as opposed to sensing the "entire" charge on the photodiode as in the prior art. Returning to the present invention discussion, a voltage change is created at the floating diffusion 80 upon initiation of charge transfer, and the voltage change is sent out through the pixel amplifier (M2) 100 to the column pulse detector 40 via the column bus 95. This voltage change (positive or negative) triggers the pulse detector 40 to change output states. The "enable" input of the counter 50 senses the change in output from the pulse detector 40 and then stops counting. The content of the column counter 50 is the raw pixel digital output.

Referring to FIGS. 4a-4c, it is noted for clarity that the prior art detects the number of electrons. In contrast, the image sensor of the present invention detects the electrical charge potential of the photodiode, or in other words, it detects the depth of the unfilled potential well of the photodiode. With the presence of the light on the photodiode 60 in the pixel array 20, electrical charges are generated and accumulated in an electrical potential well 121 in the photodiode 60. There is a transfer gate (TG) 70 in the pixel in between the photodiode 60 and a floating diffusion ($C_{FD}$) 80, which floating diffusion 80 is used to convert the charge to voltage. The voltage applied on the gate of the transfer gate (TG) 70 controls the potential underneath the gate and creates a conductive channel when the voltage is higher the threshold voltage of the transfer gate 70. The potential well 121 of the photodiode 60 and the floating diffusion area 80 are connected by this created channel of the transfer gate (TG) 70. With the increase of this gate voltage, the electrical potential underneath the gate is lowered. When the potential underneath the transfer gate 70 is equal to the electrical potential of the well 121 of the photodiode 60, charge accumulated in the photodiode 60 starts to move from photodiode 60 to the diffusion area 80 through the transfer gate (TG) 70. The move of charge from photodiode 60 to the floating diffusion ($C_{FD}$) 80 will generate a voltage signal at the floating diffusion ($C_{FD}$) area 80 which is then sent to the input of the pixel amplifier (M2) 100. The pulse detector 40 detects the voltage change at the column bus 95. The move of the electrons from photodiode 60 to the floating diffusion 80 will trigger the pulse detector 40 in the column analog-to-digital converter 30 to change its output state. This change of pulse detector 40 output state stops the counter 50 and a raw digital code is generated at the counter 50 output. This digital code or the digital signal represents the image signal created by the pixel. This raw digital code includes undesirable characteristics, such as noise and offsets, which may be corrected and calibrated in the next digital processing stages as is well known by those skilled in the art.

Figure 5:
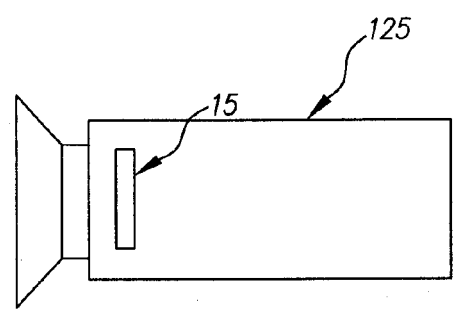
FIG. 5 is a digital camera of the present invention for illustrating a typical commercial embodiment for the image sensor of the present invention.

Referring to FIG. 5, there is shown a digital camera 125 in which the image sensor 15 of the present invention is disposed for illustrating a preferred commercial embodiment of the present invention.

The invention has been described with reference to a preferred embodiment. However, it will be appreciated that variations and modifications can be effected by a person of ordinary skill in the art without departing from the scope of the invention.

PARTS LIST 10 pixel array
15 image sensor
20 pixel
25 analog-to-digital converter array
30 analog-to-digital converter
40 pulse detector
50 counter
60 photosensitive region or photodiode
70 transfer gate (TG)
80 charge-to-voltage conversion region or floating diffusion ($C_{FD}$)
90 reset transistor (RG)
95 pixel output column bus
100 pixel amplifier or amplifier transistor (M2)
110 row select transistor
121 electrical potential well
125 digital camera

The invention claimed is:

1. An image sensor comprising:
   (a) a photosensitive region that accumulates charge corresponding to received incident light;
   (b) a transfer gate for transferring all or a portion of the charge from the photosensitive region;
   (c) a voltage supply having an increasing voltage over time that is applied to the transfer gate;
   (d) a floating diffusion for receiving the all or a portion of the charge from the photosensitive region and converting the charge to a voltage;
   (e) an amplifier for receiving and amplifying a signal from the floating diffusion;
   (f) a pulse detector for detecting a voltage pulse from the amplifier; and
   (g) a counter for counting clock cycles between initiation of the increasing voltage until a signal is received from the detector which indicates initiation of charge transfer from the photosensitive region to the floating diffusion.

2. The image sensor as in claim 1, wherein the voltage pulse is either a positive or negative direction.

3. The image sensor as in claim 1 further comprising a reset transistor for resetting both the floating diffusion and the counter.

4. The image sensor as in claim 1, wherein the photosensitive region is a photodiode.

5. The image sensor as in claim 1 further comprising a row select transistor electrically connected to the amplifier for enabling readout.

6. The imaging device comprising:
   (a) a photosensitive region that accumulates charge corresponding to received incident light;
   (b) a transfer gate for transferring all or a portion of the charge from the photosensitive region;
   (c) a voltage supply having an increasing voltage over time that is applied to the transfer gate;
   (d) a floating diffusion for receiving the all or a portion of the charge from the photosensitive region and converting the charge to a voltage;
   (e) an amplifier for receiving and amplifying a signal from the floating diffusion;
   (f) a pulse detector for detecting a voltage pulse from the amplifier; and
   (g) a counter for counting clock cycles between initiation of the increasing voltage until a signal is received from the detector which indicates initiation of charge transfer from the photosensitive region to the floating diffusion.

7. The imaging device as in claim 6, wherein the voltage pulse is either a positive or negative direction.

8. The imaging device as in claim 6 further comprising a reset transistor for resetting both the floating diffusion and the counter.

9. The imaging device as in claim 6, wherein the photosensitive region is a photodiode.

10. The imaging device as in claim 6 further comprising a row select transistor electrically connected to the amplifier for enabling readout.

11. A method of operating an image sensor, the method comprising the steps of:
   (a) accumulating charge corresponding to received incident light by a photosensitive region having a capacity;
   (b) transferring all or a portion of the charge from the photosensitive region by a transfer gate;
   (c) applying an increasing voltage over time to the transfer gate;
   (d) receiving all or a portion of the charge from the photosensitive region and converting the charge to a voltage by a charge collection portion; and
   (e) using a pulse detector and counter for indicating initiation of charge transfer from the photosensitive region to the charge collection portion; wherein an output digital signal represents a part of the capacity which said part is based on a predetermined relationship with the capacity occupied by the charge.

12. The method as in claim 11 further comprising the step of providing an unfilled capacity as the part of the capacity based on the predetermined relationship.

13. The method as in claim 11 further comprising the step of providing the charge collection region as a floating diffusion.

14. The method as in claim 11 further comprising the step of providing the photosensitive region as a photodiode.

15. The method as in claim 12 further comprising the step of providing the charge collection region as a floating diffusion.

16. The method as in claim 11 further comprising providing the voltage pulse is either a positive or negative direction.

* * * * *